Jan. 30, 1962  S. HOPFER  3,019,386
T-JUNCTION STANDING WAVE INDICATOR
Filed Feb. 9, 1955  2 Sheets-Sheet 1

INVENTOR
SAMUEL HOPFER
BY Ralph B. Stewart
ATTORNEY

Jan. 30, 1962  S. HOPFER  3,019,386
T-JUNCTION STANDING WAVE INDICATOR
Filed Feb. 9, 1955  2 Sheets-Sheet 2
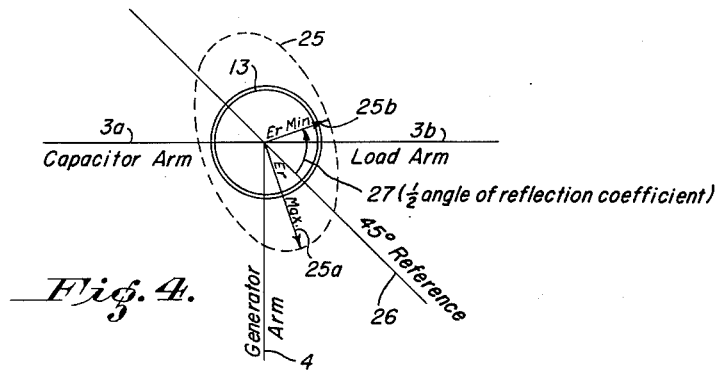
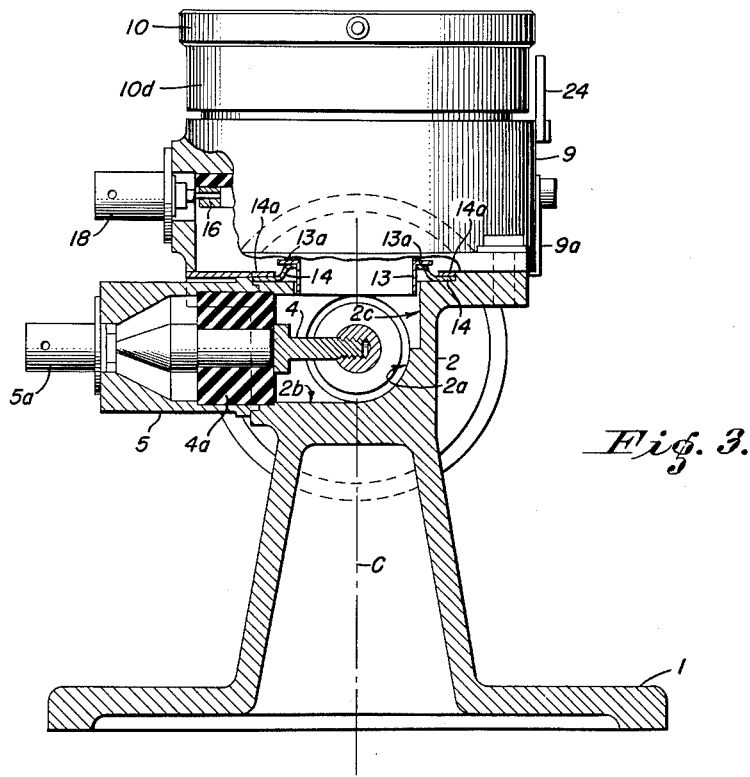
INVENTOR
*SAMUEL HOPFER*
BY *Ralph B. Stewart*
ATTORNEY

United States Patent Office 3,019,386
Patented Jan. 30, 1962

3,019,386
T-JUNCTION STANDING WAVE INDICATOR
Samuel Hopfer, Brooklyn, N.Y., assignor to Polytechnic Research & Development Co., Inc., Brooklyn, N.Y., a corporation of New York
Filed Feb. 9, 1955, Ser. No. 487,152
8 Claims. (Cl. 324—58)

This invention relates to a device for the measurement of various characteristics involved in wave transmission, such as the voltage standing wave ratio and the angle of the reflection coefficient or the load reflection coefficient. The invention is useful in the measurement of impedance.

The embodiment of the invention described herein is designed especially for use in the frequency range extending from 50 megacycles per second to 1000 megacycles per second.

My standing wave indicator is the type embodying a coaxial cable T-junction having the "stem" arm connected to a source of wave energy and the two aligned arms connected respectively to a variable condenser and to an unknown load. A circular side-arm dimensioned below cutoff has one end thereof coupled with the field produced by the three arms of the junction, its axis extending to the plane of the three arms of the junction and passing through the junction point for the axes of the three arms. A pickup element is mounted within the circular side-arm and is arranged to be rotated about the axis of the circular side-arm to explore the field established within the side-arm.

It can be shown mathematically that if the wave energy within the circular side-arm is limited to the $TE_{11}$ mode, and if the three arms of the coaxial junction are equally coupled to the pickup element within the circular side-arm, and the variable condenser has a normalized reactance of unity, a standing wave field of elliptical pattern will be established within the circular side-arm, and the standing wave will be a true reproduction of the standing wave which would be obtained in a slotted section of the load line of a length equal to one wave length. By this arrangement the pick-up is rotated through the same angular range for all wavelengths, whereas in the case of a slotted line section, the extent of movement of the probe will vary with the wavelength of the applied energy.

The general object of the present invention is to devise an improved standing wave indicator of the type indicated above.

Specific objects of my invention are as follows:

(1) To devise an improved pickup structure embodied within the circular side arm. In my improved indicator the circular side-arm is mounted to rotate about its own axis, and the pickup comprises a simple cross-bar or probe extending across the circular side-arm, one end of the probe being connected to the side-arm through a by-pass capacity and the other end connected directly to a detector.

(2) To mount the detector upon the rotary side-arm and in a position to be directly connected with the un-bypassed end of the probe, thereby confining the high frequency energy to a small space within the indicator housing.

(3) To provide a collector ring arrangement for taking off detected current from the by-pass end of the probe, thus avoiding the use of flexible conductors which twist with the turning of the pickup element.

(4) To provide for equal coupling between the three arms of the T-junction and the pickup probe. This is accomplished by forming the line of the generator arm of a smaller diameter than the lines of the two aligned arms of the junction.

In prior indicators of the T-junction type, one form of pickup element has been in a pickup loop mounted to rotate within a stationary circular side arm, the loop being formed of a transverse pickup portion supported on two parallel lead portions which conduct high frequency energy out of the side-arm to an external detector. With such an arrangement, difficulty is likely to arise due to unbalance of the loop and the parallel connecting leads, and also due to resonance effects in the lead portions of the loop. In applicant's structure, the high frequency leads are eliminated, and the detector is mounted at one end of the probe so that no high frequency energy is removed from the circular side arm through leads which are twisted together by the turning of the pickup element. In applicant's indicator, only detected current (D.C. or low frequency current) is removed from the indicator, and this is accomplished through a slip-ring so that all connections to the indicator may be completed through transmission lines having fixed or stationary connections to the instrument.

A preferred embodiment of the invention is illustrated in the accompanying drawing in which FIGURE 1 is a plan view of the indicator;

FIGURE 3 is a sectional view of FIGURE 1 taken along the line of 3—3, with certain parts being shown in elevation;

FIGURE 4 is a diagram for explaining the operation of the invention.

Figure 1:
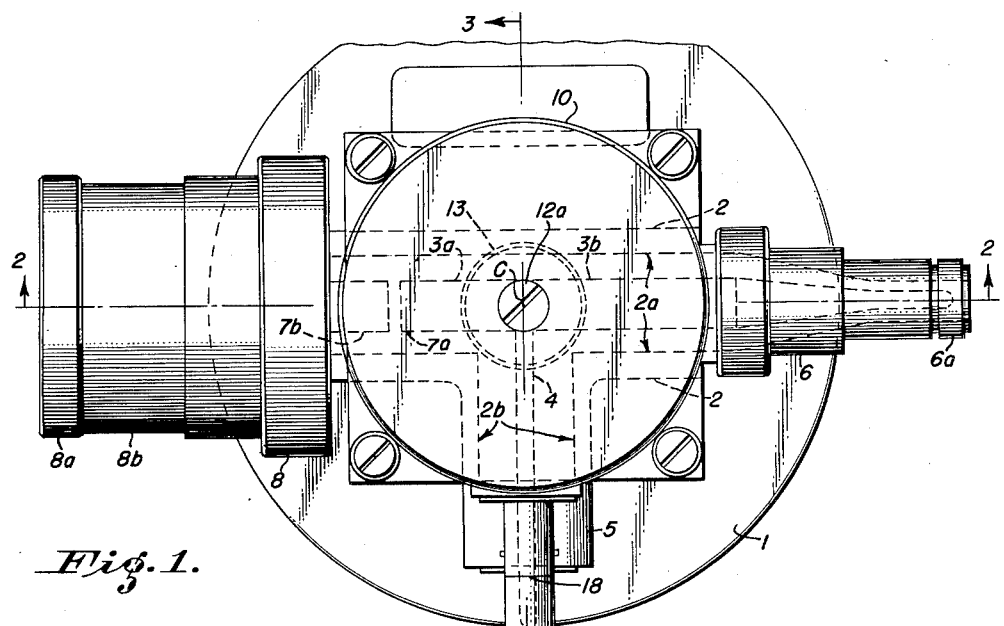
Figure 2:
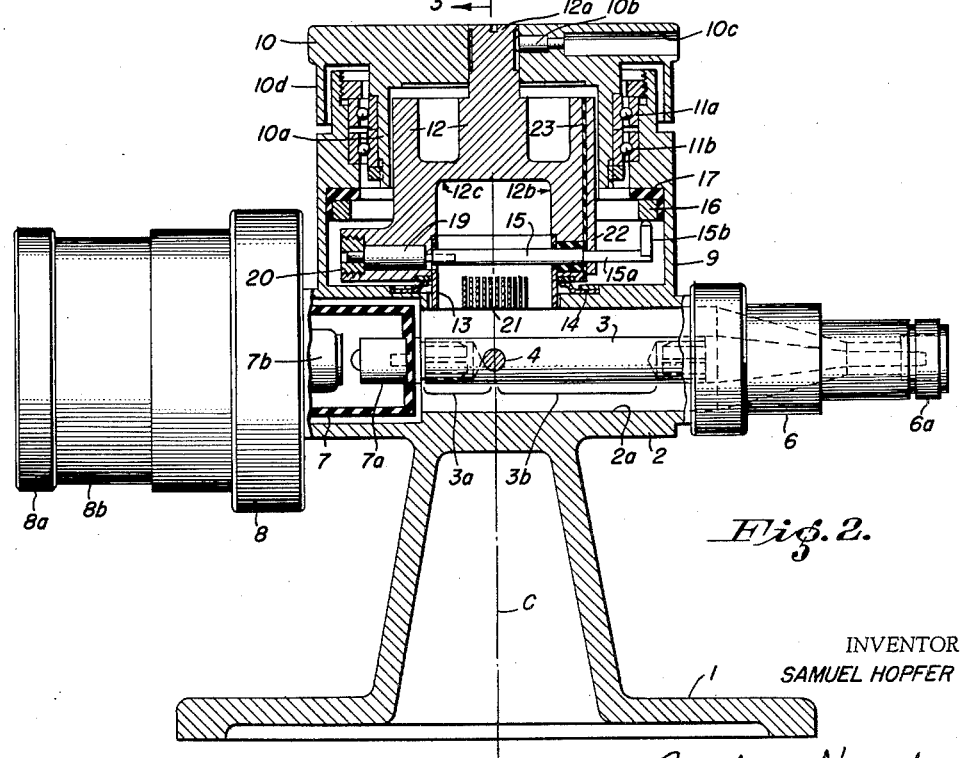
FIGURE 2 is a sectional view of FIGURE 1 taken along the line of 2—2, with certain parts shown in elevation.

Referring to FIGURES 1 to 3, a suitable base 1 supports a block 2 which is suitably bored with two horizontal bores 2a and 2b formed on axes which intersect the vertical center line C at right angles to each other. Bore 2a contains a center conductor 3 extending to opposite sides of the center line C of the T-junction, the portion 3a extending to the left of the line C in FIGURE 2 comprising the capacity arm of the T-junction, while the portion 3b extending to the right of the center line comprises the load arm of the junction. Bore 2b arranged at right angles to the bore 2a contains a center conductor 4 which is connected to conductor 3 and forms the generator arm of the junction.

Center conductors 3 and 4 are supported within their respective bores by suitable dielectric beads, such as the bead 4a for supporting the center conductor 4, see FIGURE 3. This bead is supported within a removable line-reducing fitting 5 which terminates in a standard coaxial cable socket connector 5a by which the center conductor 4 is connected to a suitable wave generator. The load arm section 3b of conductor 3 is provided with a removable line-reducing fitting 6 which terminates in a standard coaxial cable socket connector 6a by which a suitable load is connected to the load arm of the indicator. The portion 3a of the center conductor 3 is terminated in a variable condenser structure which may assume different forms. In the arrangement shown in FIGURE 2, the variable condenser is constructed as a removable unit contained within an insulating housing 7 which extends into a counterbore formed in the left end of the bore 2a and carries fixed condenser plate structure shown at 7a which is connected to center conductor section 3a by a suitable plug and socket connection. The movable plates of the condenser are shown at 7b and are carried by a suitable housing 8 which is detachably secured to the block 2 in any suitable manner and which contains suitable driving means for moving the plates 7b towards and away from the fixed plates 7a, the driving means being operated by the rotary head or knob 8a having a cylindrical portion 8b extending into housing 8. Preferably both sets of condenser plates 7a and 7b are formed of concentric cylinders arranged so that the plates 7b move into interleaving relation with the plates 7a, or may be separated entirely from the plates 7a in the manner shown in FIGURE 2. By constructing the variable condenser in the manner described, condensers of different maximum values may be used interchangeably in the instrument. Each condenser would have its own housing 8 and adjusting knob 8a, and the portion 8b may carry a scale (a spiral scale), graduated in frequency, to indicate the proper setting of the condenser to obtain a normalized reactance value of unity.

The block 2 containing the T-junction is also provided with a third bore 2c formed on the vertical axis C in the upper portion of the block for receiving the lower end of the circular side-arm. Supported on the top face of the block C is a cylindrical casing 9 arranged concentric with the vertical axis C. A cap 10 is arranged to close the upper end of the casing 9 and is mounted for rotation about the vertical axis C by means of a pair of ball-bearing assemblies 11a and 11b, the outer races of which are supported on the inner wall of the cylindrical casing 9, and the inner races being supported on the outer surface of a cylindrical flange 10a extending downwardly from the cap 10 inside of the casing 9.

Arranged within the cylindrical flange 10a and extending downwardly into the lower portion of the casing 9 is a rotor member 12 which is supported from the cap 10 by a central stem 12a extending into a central bore formed in the cap 10. The rotor 12 is capable of limited vertical movement with respect to cap 10 and is held in any desired position within this range by a set screw 10b which may be adjusted through the radial bore 10c formed in the cap.

The rotor member 12 is provided with a vertical counterbore 12b formed in the lower face thereof concentric with the axis C and having a flat bottom wall 12c. Supported within the open end of the bore 12b is a sleeve 13 formed of suitable highly conductive metal, the inner surface of the sleeve 13 being of the same diameter as the counterbore 12b, so that the sleeve 13 and the counterbore 12b constitute a circular waveguide coupled at its lower end to the fields of the three arms of the T-junction and having its other end short-circuited by the end wall 12c. The walls of the circular waveguide may be plated with silver or other low-resistance metal. The lower end of sleeve 13 extends downwardly below rotor 12 and into the vertical bore 2c, as shown in FIGURE 3. The outside diameter of the sleeve 13 is somewhat smaller than the bore 2c to permit free turning of the sleeve within the bore. For the purpose of preventing the loss of energy through the annular gap between the sleeve 13 and the bore 2c, the sleeve 13 is provided with a radial flange 13a extending outwardly from the sleeve and located at the lower end of the rotor member 12. An annular contact ring 14 formed of resilient material of good conductivity, such as beryllium copper, is supported on the upper face of the block 2 surrounding the bore 2c, and is held in position on the block by a clamping ring 14a covering the outer peripheral portion of the contact ring 14. The inner peripheral portion of the ring 14 is slotted radially at spaced points to form inwardly extending contact fingers which are bent upwardly to engage the lower face of the annular flange 13a mounted on the sleeve 13. Thus, the ring 13a and the contact ring 14 form a short-circuit for the annular waveguide existing between the sleeve 13 and the wall of counterbore 2c, and the arrangement prevents appreciable loss of energy through the annular gap between sleeve 13 and the wall of the counterbore 2c. The contact fingers of ring 14 are sufficiently resilient to permit of limited vertical adjustment of the rotor 12 when it is desired to adjust the coupling between the sleeve 13 and the three arms of the T-junction.

The pickup element comprises a cross-bar or probe 15 extending diametrically across the sleeve 13 at a point spaced from the open end thereof and passing through enlarged openings in the sleeve. The right end of the probe 15 as shown in FIGURE 2 extends through an insulating mounting bead located in a hole in the wall of the rotor 12, and the terminal portion 15a of the probe extends beyond the rotor 12 and carries a resilient contact finger 15b at the outer end thereof. The free end of the contact finger 15b engages a collector ring 16 which is supported within the casing 9 by an annular ring 17 of insulating material. As shown in FIGURE 3, the ring 16 is connected to a standard coaxial cable socket connector 18 mounted on the casing 9 immediately above the generator line connector 5.

Opposite the left end of the probe 15, as shown in FIGURE 2, a suitable detector 19 is mounted within a bore formed in the wall of rotor 12 in alignment with the probe 15 and is connected to the end of the probe by a pin and socket connection so that the detector may be replaced. The detector is retained within the bore and its left end is electrically connected to the rotor 12 by means of a threaded plug 20 screwed into the outer end portion of the detector bore. A suitable opening is formed in the casing 9 opposite the plug 20 for removing the plug and the detector from the casing 9, the opening being formed opposite the cable connector 18 as shown in FIGURE 3 and being covered by a removable cover plate 9a.

The inner diameter of the sleeve 13 is dimensioned so that the circular side-arm formed of the sleeve 13 and the counterbore 12b is dimensioned below cutoff for the wavelengths within the frequency range to be covered by the instrument, and the probe 15 is spaced from the lower end of sleeve 13 so that the wave energy reaching the probe 15 is substantially limited to that of the $TE_{11}$ mode. For the purpose of preventing appreciable amounts of other modes from reaching the probe 15 and permitting the probe to be located near the open end of the cutoff arm, a mode filter is mounted within the sleeve 13 below the probe 15 and comprises a plurality of thin strips of metal 21 of good conductivity arranged in parallel spaced relation across the tube 13 and at right angles to the probe 15. As shown in FIGURE 2, the planes of the strips 21 are vertical.

The right-end portion 15a of the probe 15 is by-passed to the rotor 12 through a condenser structure formed of a conducting plate 22 mounted upon the rotor 12 but insulated therefrom by an insulating strip 23. This by-pass condenser prevents high frequency energy from going out over the collector ring 16 to the cable connector 18.

From the foregoing it will be seen that the circular side-arm embodied in the rotor 12 is mounted for turning movement about the axis C and may be rotated continuously through any desired angle by rotating the cap 10, thus turning the probe 15 to different angular positions. Cap 10 is provided with a cylindrical flange 10d extending downwardly from its outer peripheral portions and surrounding the outside of the upper end of cylindrical casing 9. The outer surface of this cylindrical flange may be graduated in degrees or other suitable graduations to indicate the amount of turning of the pickup element. A strip of transparent material 24 is secured to the casing 9 and extends upwardly over the flange 10d and carries an index mark to facilitate the reading of the dial or scale on the flange 10d.

For best accuracy of indication, the pickup probe should be coupled to the three arms of the T-junction by equal amounts of coupling. While the two aligned arms of the T-junction will have the same amount of coupling to the pickup probe, the generator arm will have a different amount of coupling due to its slightly different surrounding or environment. For the purpose of producing a broadband compensation of the unequal coupling, the diameter of the generator arm (conductor 4) is substantially reduced below the diameter of the two aligned arms 3a and 3b. I have found that by making the generator arm conductor substantially one-half the diameter of the center conductor of the two aligned arms, the residual VSWR is less than 1.02 over the entire frequency band of the instrument.

In FIGURE 4 is a diagram for explaining the operation of the indicator. The three arms of the T-junction are shown at 3a, 3b and 4, respectively, and the side-arm containing the pickup probe is shown at 13. The elliptical curve 25 illustrates the pattern of the field established within the tube 13, and the line 26 which bisects the angle between the load arm 3b and the generator arm 4 is a reference line for the measurement of angles on the scale carried by the flange 10d. By turning the cap 10 through 360°, the voltage picked up by the probe 15 will vary in value in accordance with variations in the radius vector from the center of the T-junction out to the curve 25. Thus, in a complete revolution, the voltage will vary between a maximum value at 25a and a minimum value at 25b, both values occurring twice in one revolution. Where the arm 3a is terminated in a capacity reactance of a normalized value of unity, the ratio of the voltage maximum to the voltage minimum is equal to the VSWR of the load. Further, the angle 27 between the minor axis (the first position of minimum voltage) and the 45° reference line 26 is equal to one-half the phase angle of the load reflection coefficient.

Purely for illustrative purposes, and not by way of limitation, I have found that an embodiment of my invention having the dimensions listed below gives satisfactory operation over the frequency range of 50 megacycles per second to 1000 megacycles per second:

Diameter of bores 2a and 2b=0.811"
Diameter of center conductor 3=0.353"
Diameter of center conductor 4=0.165"
Inside diameter of circular side-arm=0.900"
Length of circular side-arm=1.033"
Diameter of probe=0.120"
Probe set back from end of circular side-arm=.390"

The detector is a General Electric Company diode type G-7. The two different sizes of condenser 7a—7b are required to produce a normalized reactance value of unity over the entire frequency range from 50 to 1000 megacycles. The condenser has normalized unity value when its reactance is equal to the characteristic impedance of the load line.

It will be obvious that the invention is capable of being embodied in other structures than that specifically shown and described herein.

I claim:

1. A standing wave indicator comprising a T-junction having three coaxial arms, a circular side-arm arranged normal to the plane of the T-junction and having one end thereof coupled to the field produced by all three arms of said junction, the center conductor of the two aligned arms of said junction being of the same diameter on opposite sides of the junction, and the center conductor of the stem arm of said T-junction being formed of a size substantially less than the center conductor of the two aligned arms of said junction to equalize the coupling between said side-arm and the three arms of said junction.

2. A standing wave indicator comprising a T-junction formed of a block of conducting material having a through-bore and a cross-bore intersecting said through-bore at right angles thereto, said block having a third bore formed on an axis at right angles to the axis of said through-bore and cross-bore and intersecting said axes at a common point, center conductors forming a T-junction in said through-bore and cross-bore, the center conductor sections in said through-bore on opposite sides of said junction being of the same diameter, a circular side-arm having one end thereof positioned within said third bore and coupled to the field produced by all three arms of said junction, the center conductor of said cross-bore having a diameter substantially smaller than the diameter of center conductor in said through-bore to equalize the coupling between said circular side-arm, and the fields of said three arms, and means mounting said side-arm for rotation about the axis of said third bore.

3. A standing wave indicator according to claim 2 wherein the means for mounting said circular side-arm includes means providing for adjustment of said circular side-arm along its axis to vary the spacing between the inner end of said side-arm and said center conductors.

4. A standing wave indicator comprising a T-junction having three coaxial arms, a circular side-arm arranged normal to the plane of the T-junction and having one end thereof coupled to the field produced by all three arms of said junction, the center conductor of the two aligned arms of said junction being of the same diameter on opposite sides of the junction, and the center conductor of the stem arm of said T-junction being formed of a size substantially less than the center conductor of the two aligned arms of said junction to equalize the coupling between said side-arm and the three arms of said junction, means mounting said circular side-arm for turning about its longitudinal axis, said circular side-arm being provided with a pair of aligned apertures formed in opposite wall portions thereof, a pick-up conductor arranged across said side-arm within said apertures, a detector connected between one end of said conductor and said side-arm and carried by said side-arm, a by-pass condenser mounted on the outside of said side-arm adjacent the other end of said pick-up conductor and connecting said other end to said side-arm, and a connection from said other end of said pick-up conductor for taking off detected currents.

5. A standing wave indicator according to claim 4 and including a circular casing surrounding said circular side-arm in spaced concentric relation, an insulated collector ring mounted within said casing concentric with said side-arm, a brush carried by said other end of said pick-up conductor and having sliding contact with said collector ring, and a take-off connection extending from said collector ring to the outside of said casing.

6. A standing wave indicator comprising a T-junction having three coaxial arms, the outer conductors of said arms at said junction having a circular aperture formed therein on an axis passing through the junction at right angles to the plane thereof, a circular side-arm arranged normal to the plane of the T-junction and having one end thereof positioned within said aperture and coupled to the field produced by all three arms of said junction, and means supporting said circular side-arm for rotation about its axis, said circular side-arm being provided with a pair of aligned apertures formed in opposite wall portions thereof, a detector mounted in one of said apertures and having one terminal thereof connected to said circular side-arm, a pick-up conductor arranged across said side-arm on the axis of said apertures, one end of said pick-up conductor being connected to the other terminal of said detector and the other end of said conductor extending out of the other aperture, a by-pass condenser mounted on the outside of said side-arm adjacent the other end of said pick-up conductor and connecting said other end to said side-arm, and a connection from said other end of said pick-up conductor for taking off detected currents.

7. A standing wave indicator comprising a T-junction having three coaxial arms, the outer conductors of said arms at said junction having a circular aperture formed therein on an axis passing through the junction at right angles to the plane thereof, a circular side-arm arranged normal to the plane of the T-junction and having one end thereof positioned within said aperture and coupled to the field produced by all three arms of said junction, a circular metallic casing surrounding said circular side-arm in spaced concentric relation therewith, a cap for closing the upper end of said casing and having a central bore formed therein on the axis of said circular side-arm, said circular side-arm being closed at its outer end and having a stem slidably mounted in the central bore of said cap, means for clamping said stem in the bore of said cap in different axially adjusted positions to vary the coupling between said one end of said circular side-arm and the field produced by the arms of said T-junction, and bearing means supporting said cap upon said casing for rotation of said cap and said circular side-arm about the axis of said circular side-arm.

8. A standing wave indicator comprising a T-junction having three coaxial arms, the outer conductors of said arms at said junction having a circular aperture formed therein on an axis passing through the junction at right angles to the plane thereof, a circular side-arm arranged normal to the plane of the T-junction and having one end thereof positioned within said aperture and coupled to the field produced by all three arms of said junction, means supporting said circular side-arm for rotation about its axis, said circular side-arm being provided with a pair of aligned apertures formed in opposite wall portions thereof located near said one end of said side-arm, a detector mounted in one of said apertures and having one terminal thereof connected to said circular side-arm, a pick-up conductor mounted on the axis of said apertures with one end connected to the other terminal of said detector and the other end of said conductor passing through the other aperture, a circular metallic casing surrounding said circular side-arm, in spaced concentric relation therewith, an insulated terminal mounted upon said casing and presented on the outside thereof, a detected-current take-off connection extending from the free end of said pick-up conductor to said insulated terminal and including a sliding-contact assembly mounted within the annular space between said side-arm and said casing, and a by-pass condenser carried by said side-arm on the outside thereof within said casing and connecting the output end of said pick-up conductor to said side-arm.

References Cited in the file of this patent

UNITED STATES PATENTS

| | | |
|---|---|---|
| 2,473,274 | Bradley | June 14, 1949 |
| 2,527,979 | Woodward | Oct. 31, 1950 |
| 2,580,679 | Hansen | Jan. 11, 1952 |
| 2,584,162 | Sensiper et al. | Feb. 5, 1952 |
| 2,643,296 | Hansen | June 23, 1953 |
| 2,679,582 | Edwards | May 25, 1954 |
| 2,723,377 | Cohn | Nov. 8, 1955 |
| 2,724,806 | Tillotson | Nov. 22, 1955 |
| 2,818,547 | Laemmel | Dec. 31, 1957 |
| 2,852,741 | Bird et al. | Sept. 16, 1958 |

FOREIGN PATENTS

| | | |
|---|---|---|
| 116,110 | Australia | Oct. 3, 1941 |
| 592,224 | Great Britain | Sept. 11, 1947 |
| 604,270 | Great Britain | July 1, 1948 |